United States Patent
Johnson (10) Patent No.: US 7,342,536 B2
(45) Date of Patent: Mar. 11, 2008

(54) SYSTEM AND METHOD FOR DETERMINING THE LOCATION OF EMITTERS HAVING WELL-BEHAVED TIMING FEATURES

(75) Inventor: J. Andrew Johnson, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 86 days.

(21) Appl. No.: 11/224,576

(22) Filed: Sep. 12, 2005

(65) Prior Publication Data

US 2007/0075900 A1    Apr. 5, 2007

(51) Int. Cl.
    *G01S 3/02*    (2006.01)
(52) U.S. Cl. ..................... 342/442; 342/451
(58) Field of Classification Search ............. 342/386, 342/442–443, 457, 463–465, 451; 455/456.1, 455/456.2, 456.3; 702/196
See application file for complete search history.

(56) References Cited

U.S. PATENT DOCUMENTS

| | | | |
|---|---|---|---|
| 5,373,236 A | 12/1994 | Tsui et al. | |
| 5,406,291 A | 4/1995 | Guerci et al. | |
| 5,493,308 A | 2/1996 | Bingham et al. | |
| 5,502,450 A | 3/1996 | Zablotney et al. | |
| 5,526,001 A | 6/1996 | Rose et al. | |
| 5,534,866 A | 7/1996 | Rose | |
| 5,570,099 A | 10/1996 | DesJardins | |
| 5,583,505 A | 12/1996 | Andersen et al. | |
| 5,610,609 A | 3/1997 | Rose | |
| 5,744,710 A | 4/1998 | Abatzoglou et al. | |
| 5,774,087 A | 6/1998 | Rose | |
| 5,835,060 A | 11/1998 | Czarnecki et al. | |
| 5,874,916 A | 2/1999 | Desiardins | |
| 5,914,687 A | 6/1999 | Rose | |
| 5,936,571 A | 8/1999 | Desjardins | |
| 5,991,454 A | 11/1999 | Fowler | |
| 6,100,845 A | 8/2000 | Rose | |
| 6,148,211 A * | 11/2000 | Reed et al. | 455/456.2 |
| 6,163,297 A | 12/2000 | Rose | |
| 6,255,992 B1 | 7/2001 | Madden | |
| 6,275,189 B1 | 8/2001 | Rubin | |

(Continued)

FOREIGN PATENT DOCUMENTS

EP    0874248 A3    9/1999

OTHER PUBLICATIONS

Data Fusion for Improved TOA/TDOA Position Determination in Wireless Systems, author(s): Rahman I. Reza.

(Continued)

*Primary Examiner*—Dao Phan
(74) *Attorney, Agent, or Firm*—Tarolli, Sundheim, Covell & Tummino LLP (57) ABSTRACT

A method, system, and computer program product are provided for determining the location of an emitter. A first subset of a plurality of parameters comprising a signal model associated with the emitter is selected. Values are estimated for the selected first subset of the plurality of parameters from a plurality of time of arrival measurements associated with the emitter and the signal model. Estimated values are generated for the plurality of parameters according to the estimated values for the selected first subset of the plurality of parameters, a plurality of time of arrival measurements, and the signal model.

19 Claims, 4 Drawing Sheets

U.S. PATENT DOCUMENTS

| | | |
|---|---|---|
| 6,285,319 B1 | 9/2001 | Rose |
| 6,407,703 B1 | 6/2002 | Minter et al. |
| 6,577,272 B1 | 6/2003 | Madden |
| 6,683,568 B1 * | 1/2004 | James et al. ................ 342/387 |
| 2002/0065664 A1 | 5/2002 | Witzgall et al. |
| 2003/0197644 A1 | 10/2003 | Paquelet |
| 2003/0218565 A1 | 11/2003 | Budic |
| 2004/0027276 A1 | 2/2004 | Herman |
| 2004/0075605 A1 | 4/2004 | Bradford et al. |
| 2004/0189525 A1 | 9/2004 | Beadle et al. |

OTHER PUBLICATIONS

Development of Inverse Hyperbolic Positioning Using the GSM Cellular Telephone Network, source(s): IR & D.

* cited by examiner

SYSTEM AND METHOD FOR DETERMINING THE LOCATION OF EMITTERS HAVING WELL-BEHAVED TIMING FEATURES

BACKGROUND OF THE INVENTION

1. Technical Field

The invention relates generally to data analysis methodologies and, more specifically, to systems and methods for determining the location of emitters having well-behaved timing features.

2. Description of the Prior Art

Emitter identification and geolocation algorithms provide the capability to discriminate between individual emitters and determine their locations. In general, a given emitter can be identified and distinguished from other emitters according to one or more characteristics of an emitted signal. Various geolocation algorithms are known, using a variety of different signal characteristics and combinations of signal characteristic to locate and identify emitters.

One method for locating an emitter includes analyzing the arrival time of the emissions from the emitter at a receiver. Locating the emitter from time of arrival calculations is complicated by the large number of unknown parameters associated with the task. The emitter's location is, of course, unknown in three dimensions. The period of the emitter's base clock is unknown. In addition, the clock multiples driving the timing features are unknown as well. So we see that for N observations/measurements of timing features, there are at least N+4 unknowns. Furthermore, there are multiple candidate solutions that may fit the observed data fairly well. Discriminating among the various candidates can be difficult.

SUMMARY OF THE INVENTION

In accordance with one aspect of the present invention, a method is provided for determining the location of a emitter. A first subset of a plurality of parameters comprising a signal model associated with the emitter is selected. Values are estimated for the selected first subset of the plurality of parameters from a plurality of time of arrival measurements associated with the emitter and the signal model. Estimated values are generated for the plurality of parameters according to the estimated values for the selected first subset of the plurality of parameters, a plurality of time of arrival measurements, and the signal model.

In accordance with another aspect of the invention, a computer program product, encoded on a computer readable medium and operative in a computer processor, is provided for determining the location of an emitter having well-behaved timing features from a plurality of time of arrival measurements associated with the emitter. A parameter selector selects a first subset of a plurality of parameters comprising a signal model associated with the emitter. A parameter estimator estimates values for the selected first subset of the plurality of parameters from the plurality of time of arrival measurements and the signal model. A parameter evaluator evaluates the estimated parameter values and directs the parameter selector to select a second, larger subset of the plurality of parameters if an error value associated with the estimation of the first subset meets a threshold value and directs the parameter evaluator to estimate the parameters using additional time of arrival measurements if the error value does not meet a threshold value.

In accordance with yet another aspect of the present invention, a method is provided for determining the location of an emitter. A plurality of parameters for a signal model associated with the emitter are estimated from a plurality of time of arrival measurements associated with the emitter and the signal model. A Fisher Information Matrix associated with the step of estimating the plurality of parameters is defined. A scaling matrix is defined in which the diagonal elements have values equal to the square root of the corresponding values in the Fisher Information Matrix. A scaled representation of the Fisher Information Matrix is produced using the scaling matrix. The scaled representation of the Fisher Information Matrix is inverted.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention can be implemented, at least in part, as one or more software programs. Therefore, the structures described herein may be considered to refer either to individual modules and tasks within a software program or as an equivalent hardware implementation.

Figure 1:
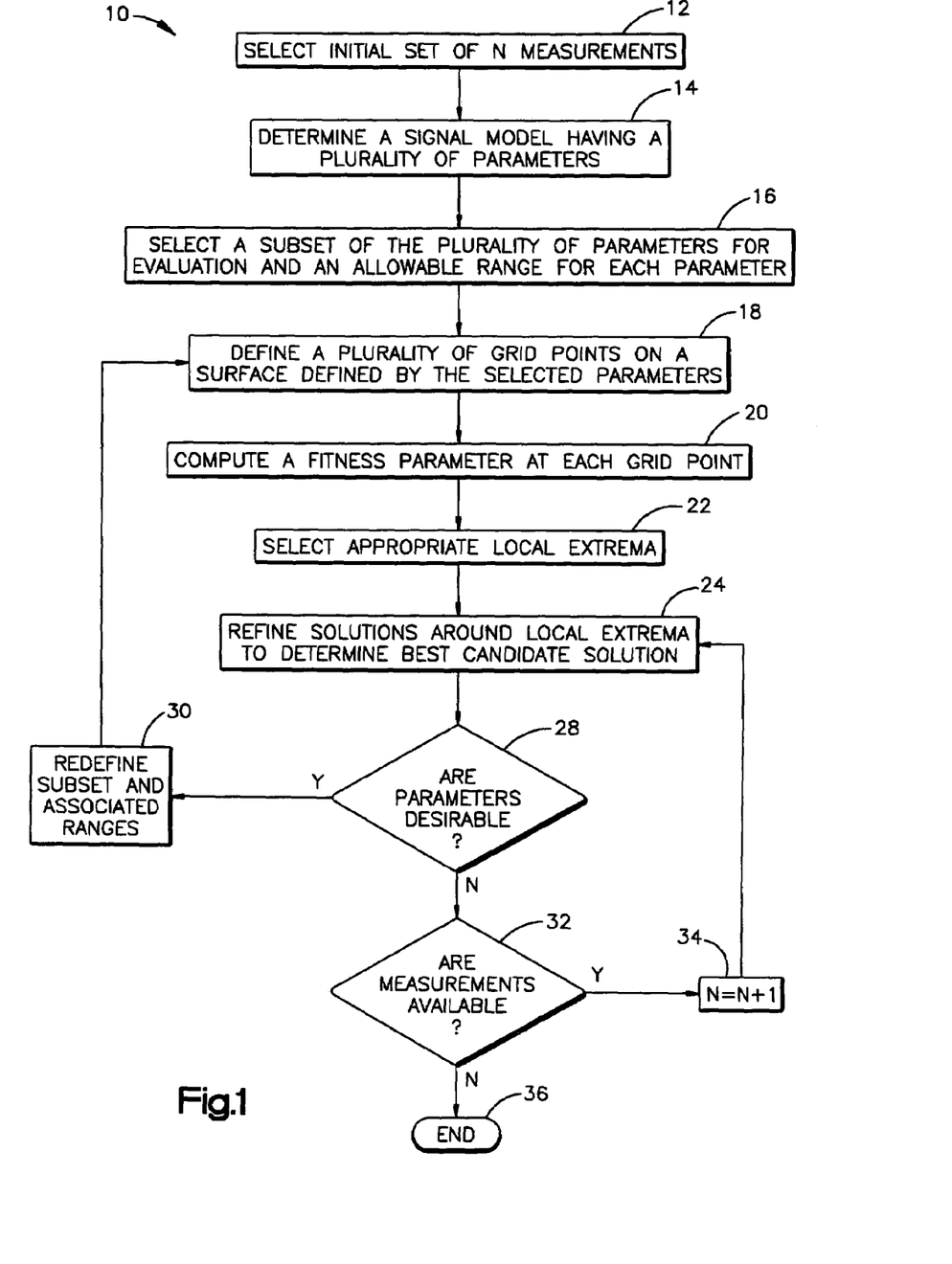
FIG. 1 illustrates a methodology for precision time of arrival (TOA) based geolocation of a emitter in accordance with an aspect of the present invention.

FIG. 1 illustrates a methodology 10 for precision time of arrival (TOA) based geolocation of an emitter having well-behaved timing features, such as a radar installation. For example, the emitter can produce signals based upon an internal base clock, such that each emitted signal shares certain underlying timing features. The methodology begins at step 12, where an initial set of N time of arrival (TOA) measurements are selected for analysis. At step 14, a signal model having a plurality of parameters is defined. In an exemplary implementation, the signal model assumes that an emitter of interest is stationary and uses a stable base clock to generate its timing information according to the following signal model:

$$s(t) \sum_{k=0}^{N-1} p[t - n_k T(1 + \lambda n_k T) - T_d] \qquad \text{Eq. 1}$$

where N is the number of evaluated time of arrival measurements, T is the period of the base clock, λ is a clock drift coefficient showing the relative drift between the emitter base clock and the base clock associated with the receiver, $n_k$ is the integral number of the clock period at which the signal k was generated, and $T_d$ is an arbitrary time offset.

It will be appreciated, however, that the methodology of the present invention can be adapted for use in locating emitters in motion by modifying the signal model of Equation 1 to include additional parameters reflecting the effects of motion on the emitted signals.

By observing the received signal from a moving platform at various points, one can observe that as the receiver moves closer to the emitter, the respective signal features are observed sooner, as the signal has less distance over which to propagate. Likewise, as the receiver move farther away, the timing features are observed with increasing delay imparted to them. Accordingly, the signal received at the receiver can be modeled as:

$$r(t) = \sum_{k=0}^{N-1} p\left[t - n_k T(1 + \lambda n_k T) - T_d - \frac{d(t)}{c} - \Gamma v(t)\right] + w(n) \qquad \text{Eq. 2}$$

where d(t) is the distance between the receiver and the emitter, Γ is a coefficient representing the sensitivity of the receiver base clock to acceleration, v(t) is the velocity of the mobile receiver, w(n) is a noise term having a Gaussian distribution with mean of zero and variance of $\sigma^2$.

It will be appreciated that the acceleration term in Eq. 2 is a linear function of the velocity of the receiver. Consider an error model in which the frequency of a time reference is affected linearly with acceleration:

$$f(t) = (1 + \Gamma a(t)) f_0, \qquad \text{Eq. 3}$$

where $f_0$ is the nominal frequency in the absence of acceleration, Γ is the frequency-acceleration coefficient, and a(t) is the acceleration of the mobile receiver.

Suppose the receiver has two time references, one which is "perfect" (Γ=0) and one which exhibits a frequency-acceleration phenomenon. Received pulses are interrogated by both references, and any difference in the measured time is considered an error.

Recall the relationship between phase and frequency:

$$f(t) = \frac{d}{dt}\phi(t) \Leftrightarrow \phi(t) = \int f(t) dt \qquad \text{Eq. 4}$$

The time error any given point is equal to:

$$\begin{aligned}T_{err} &= \frac{\phi_2(t) - \phi_1(t)}{f_0} \\ &= \frac{\int (1 + \Gamma a(t)) f_0 dt - \int f_0 dt}{f_0} \\ &= \int \Gamma a(t) dt \\ &= \Gamma v(t)\end{aligned} \qquad \text{Eq. 5}$$

Accordingly, the time measurement errors are directly proportional to velocity.

In accordance with an aspect of the present invention, two complicating factors associated with the geolocation problem can be identified. When all the available data is used to estimate a large set of parameters, a fitness surface associated with the estimation is irregular with sharp features. This makes it difficult to select an initial starting point which will lead to convergence at its extreme point. When only a few of the measured data points are used, the fitness surface tends to be smooth, but the effects of the parameters being estimated tend to be difficult to separate from one another, leading to large estimation errors.

A proposed solution is to use progressive parameter estimation. A few, closely spaced data points can be used to estimate a small subset of parameters. As more data points are included in the solution, additional parameters can be added to the estimated parameters. Estimates of the Cramer-Rao Lower Bound using measured data can be utilized to determine when it is appropriate to begin estimating a particular parameter.

Accordingly, at step 16, a subset of the plurality of parameters is selected for evaluation. Each parameter has an associated range of values that can be determined from known properties of the parameter. Each of the non-selected parameters can be assigned a default value to facilitate the estimation process. In an exemplary embodiment, the initial subset can contain the clock period, T, the clock offset, $T_d$, and a bearing parameter that indicates the direction of the emitter from the receiver. Alternatively, Cartesian coordinates representing the position of the emitter on an arbitrary coordinate plane can be determined in place of the bearing.

At step 18, a plurality of grid points are defined on a fitness surface defined by the selected parameters. It will be appreciated that the term surface is used generically, such that the "surface" can represent a space having one, two, or more than two dimensions, according to the size of the selected subset of parameters. Further, it will be appreciated that the fitness surface can represent an error value or other negative indicator of a point's fitness, referred to as a cost surface, or a positive indicator of the fitness of a given point (e.g., an inverse cost surface). The plurality of grid points can be selected according to the range of values associated with the selected parameters. In the exemplary implementation described above, the grid points can be located at increments of one degree of bearing.

At step 20, a fitness parameter is calculated at each defined grid point. For example, the selected N times of arrival can be adjusted for extraneous factors (acceleration, travel distance, etc.) according to the estimated or default parameter values associated with the defined grid point to provide approximate times of departure from the emitter. The greatest common denominator (GCD) of these approximate times of departure can be calculated via an appropriate algorithm to produce at least a GCD, representing the period of a base clock associated with the emitter, and a residual error value, which provides a fitness measure at the grid point. It will be appreciated that other methods for determining the fitness of a given point can be utilized. For example, the fitness parameter can comprise the root mean square error of the actual TOA measurements and predicted measurements based on according to the estimated or default parameter values associated with the grid point.

At step 22, at least one local extrema is determined from the plurality of grid points. It will be appreciated that the fitness surface can be represented as a cost surface, in which optimal solutions are represented by local minima, or, alternatively via an affirmative fitness measure (e.g., the inverse of the cost function), such that optimal solutions are represented as local maxima.

Once appropriate local extrema have been located, the solutions around the local extrema are refined at step 24 to determine a best candidate solution for the parameter estimation. For example, the solutions can be refined according to Newton's method or an appropriate gradient search algorithm. In accordance with Newton's method, a candidate solution, θ, comprising a set of estimated parameters, can be iteratively updated by a solution update, Δθ, comprising a set of corrections applied to the estimated parameters. A set of expected measurements, z', corresponding to the plurality of TOA measurements, are calculated according to the estimated and default parameters and the measurement model. A set of residual error values, Δz, can be calculated for a given TOA measurement according to the difference between the TOA measurements, z, and the set of expected measurements. The Jacobian, H, can then be calculated from the measurement model. The solution update can then be calculated as:

$$\Delta\theta = (H^T R^{-1} H)^{-1} H^T R^{-1} \Delta z \qquad \text{Eq. 6}$$

where R is a covariance matrix representing the measurements.

The solution update can be calculated iteratively until it falls below a threshold level or diverges. A fitness parameter, E, can be calculated as the product $\Delta z^T \Delta z$, essentially, the sum of the squared residuals from the estimated measurements and the actual measurements.

Figure 2:
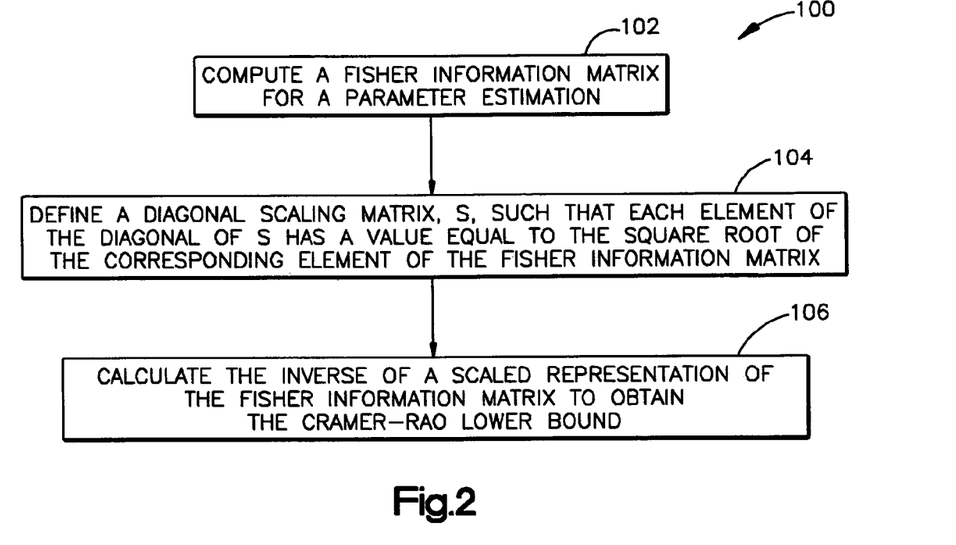
FIG. 2 illustrates a methodology for calculating the Cramer-Rao Lower Bound for a parameter estimation algorithm in a pulse time of arrival (TOA) geolocation system in accordance with an aspect of the present invention.

The best refined solution is then selected for evaluation at decision block 28. At decision block 28, it is determined if it is desirable to add or change parameters in the estimation. For example, one sign that a solution may benefit from the introduction of a new parameter is the increase of a root mean square error associated with the solution above the standard measurement error reflected by the Gaussian distribution w(n). Alternatively, the residual error value associated with the solution can be compared to a theoretical error bound (e.g., Cramer-Rao Lower Bound) to determine if a new parameter is desirable. FIG. 2 presents a methodology, in accordance with an aspect of the present invention, for efficiently calculating the Cramer-Rao lower bound.

If it is determined that the addition of new parameters is desirable (Y), the methodology advances to step 30, where a new subset of parameters is defined, along with new associated ranges. It will be appreciated that the range associated with a given parameter can be decreased through various iterations of the methodology 10, as more information is learned about the parameter values or related parameters. Accordingly, the grid points can be distributed much more finely as better estimations of the parameter are obtained. By introducing the parameters progressively, much of the complexity associated with a large number of parameters can be mitigated.

In accordance with an exemplary aspect of the present invention, the first parameter to be estimated may be a bearing parameter. As more data points are included in the solution, Cartesian coordinates, x and y, representing the position of the emitter on a plane parallel to the Earth's surface, can be determined for the emitter, using the estimated bearing to limit the search space associated with the x and y coordinates. When the solution for x and y stabilizes, then a z coordinate can be added to the estimated parameters. The clock drift coefficient, λ, can then be estimated along with the acceleration sensitivity coefficient, Γ. Once the new subset of parameters has been selected, the methodology 10 returns to step 18 to define a new set of grid points based upon the selected parameters.

If it is determined that the introduction of new parameters is not desirable (N), the methodology advances to decision block 32, where it is determined if more measurements are available for analysis. If so (Y), a new measurement is added to the analysis at step 34. The methodology then returns to step 24 to refine the solutions around the local extreme in light of the new measurement. If no new measurements are available (N), the methodology 10 terminates at 36.

FIG. 2 illustrates a methodology 100 for calculating the Cramer-Rao Lower Bound for a parameter estimation algorithm. In the illustrated implementation, the calculation is described as part of an exemplary implementation in an emitter geolocation system. In general, the estimated coordinates comprising a measurement model will include a back clock period, T, and a base clock offset, $T_d$, as well as one or more of an acceleration sensitivity coefficient, Γ, that indicates the sensitivity of the receiver clock to acceleration, a clock drift factor, λ, defining a difference in phase between the receiver clock and the emitter clock, and a set of Cartesian coordinates, x, y, and z, defining the emitter location. It will be appreciated, however, that the above coefficients are neither necessary for successful implementation of the present invention nor exhaustive.

In accordance with an aspect of the invention, subsets of the above parameters may be evaluated as part of a progressive parameter estimation routine. For example, the Cramer-Rao Lower Bound for a subset of the available parameters can be achieved by setting the parameters that are not part of the subset to default values and removing the associated rows and columns from a Fisher Information Matrix associated with the parameter estimation.

The methodology begins at step 102, where a Fisher Information Matrix is computed for the parameter estimation. In the illustrated example, the Fisher Information Matrix, J(θ), can be calculated as follows:

$$J(\theta) = \frac{1}{\sigma^2} \sum_{k=0}^{N-1} \begin{bmatrix} \left(\frac{\partial t_k}{\partial T}\right)^2 & \frac{\partial t_k}{\partial T_d}\frac{\partial t_k}{\partial T} & \frac{\partial t_k}{\partial x_e}\frac{\partial t_k}{\partial T} & \frac{\partial t_k}{\partial y_e}\frac{\partial t_k}{\partial T} & \frac{\partial t_k}{\partial z_e}\frac{\partial t_k}{\partial T} & \frac{\partial t_k}{\partial \lambda}\frac{\partial t_k}{\partial T} & \frac{\partial t_k}{\partial \Gamma}\frac{\partial t_k}{\partial T} \\ \frac{\partial t_k}{\partial T}\frac{\partial t_k}{\partial T_d} & \left(\frac{\partial t_k}{\partial T_d}\right)^2 & \frac{\partial t_k}{\partial x_e}\frac{\partial t_k}{\partial T_d} & \frac{\partial t_k}{\partial y_e}\frac{\partial t_k}{\partial T_d} & \frac{\partial t_k}{\partial z_e}\frac{\partial t_k}{\partial T_d} & \frac{\partial t_k}{\partial \lambda}\frac{\partial t_k}{\partial T_d} & \frac{\partial t_k}{\partial \Gamma}\frac{\partial t_k}{\partial T_d} \\ \frac{\partial t_k}{\partial T}\frac{\partial t_k}{\partial x_e} & \frac{\partial t_k}{\partial T_d}\frac{\partial t_k}{\partial x_e} & \left(\frac{\partial t_k}{\partial x_e}\right)^2 & \frac{\partial t_k}{\partial y_e}\frac{\partial t_k}{\partial x_e} & \frac{\partial t_k}{\partial z_e}\frac{\partial t_k}{\partial x_e} & \frac{\partial t_k}{\partial \lambda}\frac{\partial t_k}{\partial x_e} & \frac{\partial t_k}{\partial \Gamma}\frac{\partial t_k}{\partial x_e} \\ \frac{\partial t_k}{\partial T}\frac{\partial t_k}{\partial y_e} & \frac{\partial t_k}{\partial T_d}\frac{\partial t_k}{\partial y_e} & \frac{\partial t_k}{\partial x_e}\frac{\partial t_k}{\partial y_e} & \left(\frac{\partial t_k}{\partial y_e}\right)^2 & \frac{\partial t_k}{\partial z_e}\frac{\partial t_k}{\partial y_e} & \frac{\partial t_k}{\partial \lambda}\frac{\partial t_k}{\partial y_e} & \frac{\partial t_k}{\partial \Gamma}\frac{\partial t_k}{\partial y_e} \\ \frac{\partial t_k}{\partial T}\frac{\partial t_k}{\partial z_e} & \frac{\partial t_k}{\partial T_d}\frac{\partial t_k}{\partial z_e} & \frac{\partial t_k}{\partial x_e}\frac{\partial t_k}{\partial z_e} & \frac{\partial t_k}{\partial y_e}\frac{\partial t_k}{\partial z_e} & \left(\frac{\partial t_k}{\partial z_e}\right)^2 & \frac{\partial t_k}{\partial \lambda}\frac{\partial t_k}{\partial z_e} & \frac{\partial t_k}{\partial \Gamma}\frac{\partial t_k}{\partial z_e} \\ \frac{\partial t_k}{\partial T}\frac{\partial t_k}{\partial \lambda} & \frac{\partial t_k}{\partial T_d}\frac{\partial t_k}{\partial \lambda} & \frac{\partial t_k}{\partial x_e}\frac{\partial t_k}{\partial \lambda} & \frac{\partial t_k}{\partial y_e}\frac{\partial t_k}{\partial \lambda} & \frac{\partial t_k}{\partial z_e}\frac{\partial t_k}{\partial \lambda} & \left(\frac{\partial t_k}{\partial \lambda}\right)^2 & \frac{\partial t_k}{\partial \Gamma}\frac{\partial t_k}{\partial \lambda} \\ \frac{\partial t_k}{\partial \Gamma}\frac{\partial t_k}{\partial T} & \frac{\partial t_k}{\partial \Gamma}\frac{\partial t_k}{\partial T_d} & \frac{\partial t_k}{\partial \Gamma}\frac{\partial t_k}{\partial x_e} & \frac{\partial t_k}{\partial \Gamma}\frac{\partial t_k}{\partial y_e} & \frac{\partial t_k}{\partial \Gamma}\frac{\partial t_k}{\partial z_e} & \frac{\partial t_k}{\partial \Gamma}\frac{\partial t_k}{\partial \lambda} & \left(\frac{\partial t_k}{\partial \Gamma}\right)^2 \end{bmatrix} \qquad \text{Eq. 7}$$

where k is an index used to identify a plurality of pulse time of arrival measurements, $t_k$, and σ is the estimated standard deviation of the Gaussian noise within the measurements.

It will be appreciated that the above matrix can be poorly scaled. For example, the diagonal elements can have a range of values on the order of $10^{40}$.

At step 104, a diagonal matrix, S. having diagonal elements comprising the square roots of the reciprocals of corresponding elements of the Fisher Information matrix is defined, such that $S_{ii}=(J(\theta))^{-1/2}$. The inverse of the Fisher Information Matrix is then calculated at step 106 as:

$$J^{-1}(\theta)=S(SJ(\theta)S)^{-1}S \quad \text{Eq. 8}$$

It will be appreciated that the diagonal elements of (SJ(θ)S) is unity, such that its inverse is numerically tractable. Accordingly, $J^{-1}(\theta)$ can be calculated, providing the Cramer-Rao Lower Bound for the estimation process.

The above method can also be applied to refine candidate solutions in the parameter estimation, as part of the calculation of a solution update associated with Newton's method. It will be appreciated that a solution update associated with Newton's method can be calculated as:

$$\Delta\theta=(H^{T}R^{-1}H)^{-1}H^{T}R^{-1}\Delta z \quad \text{Eq. 9}$$

where H is the Jacobian associated with the measurement model, Δz is a vector of residuals associated with a plurality of measured time of arrivals and corresponding estimated time of arrivals, and R is a covariance matrix representing the measurements.

It will be appreciated that the term, $H^{T}R^{-1}H$, is the Fisher Information Matrix associated with the parameter estimation. Accordingly, the calculation of the inverse of this term can be greatly simplified through the application of the illustrated methodology 100.

Figure 3:
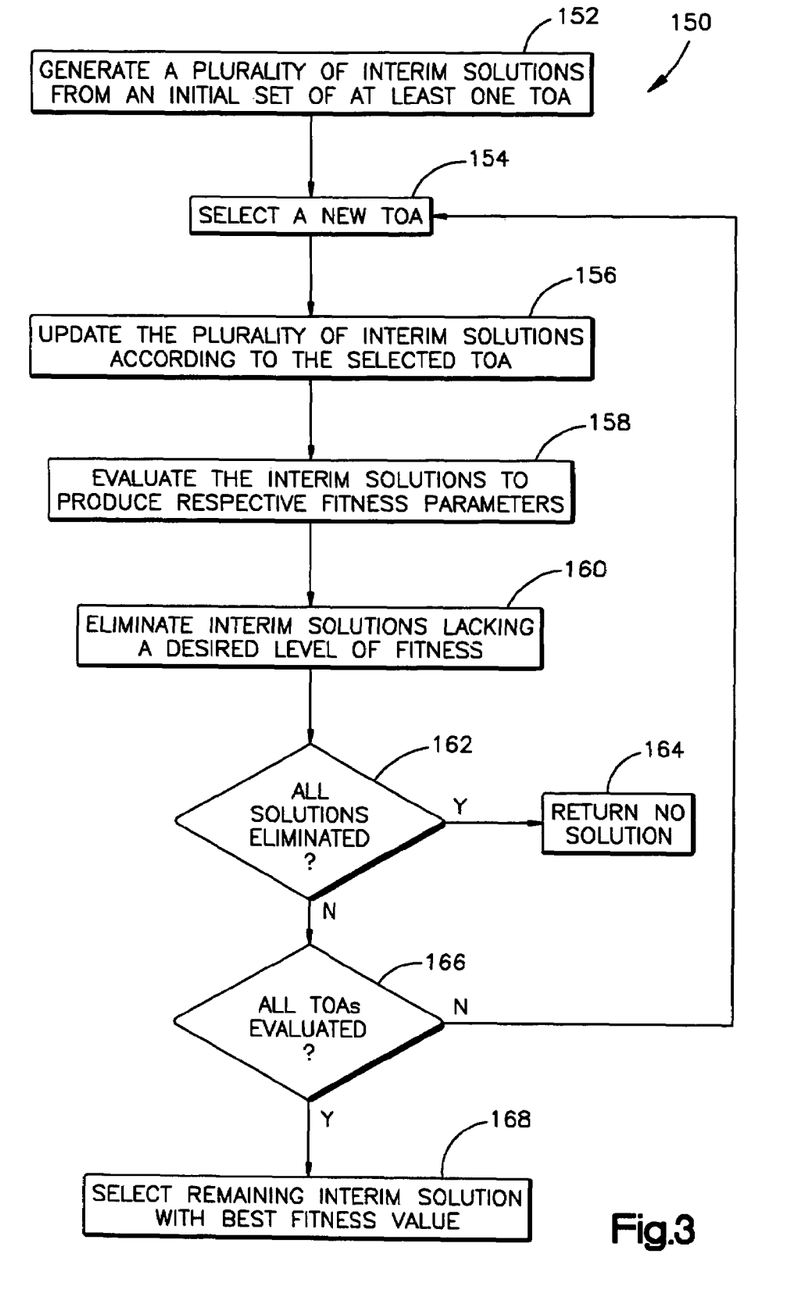
FIG. 3 illustrates a methodology for determining the greatest common divisor (GCD) of a plurality of pulse times of arrival (TOA) in accordance with an aspect of the present invention.

FIG. 3 illustrates a methodology 150 for determining the greatest common divisor (GCD) of a plurality of pulse times of arrival (TOA) in accordance with one aspect of the present invention. The methodology begins at block 152, where a plurality of interim solutions are generated from a set of at least one pulse TOA. Each interim solution can comprise a set of at least one integer multiplier associated with a given TOA or linear combination of TOAs. For example, a range of possible values can be known for the GCD according to an associated application. The plurality of interim solutions can be generated by dividing a given TOA, or a linear combination of TOAs, by associated minimum and maximum values from the range of possible values for the GCD.

At block 154, a new TOA from the plurality of TOAs is selected. At block 156, the interim solutions are updated to incorporate another multiplier value based on the selected TOA. For example, a range can be calculated from a previous estimate of the GCD and the selected TOA, and a set of integers within the range can be determined. A new set of interim solutions can be generated from each existing interim solution, wherein each interim solution in a given set comprises the multiplier values comprising its associated existing interim solution and one of the plurality of integer values.

At block 158, each of the updated interim solutions is evaluated. For example, a regression analysis can be performed using the multiplier values associated with a given interim solution and the corresponding TOAs. A fitness parameter, such as the residual error, can be determined from each regression to determine the fitness of the solution. At block 160, interim solutions having a degree of fitness that fails to meet a desired threshold are eliminated from consideration. Eliminated solutions are not updated or evaluated when a new TOA is added to the analysis.

At decision block 162, it is determined if all of the interim solutions have been eliminated. The elimination of all of the interim solutions indicates that no suitable solution is available for the collected data. If all of the interim solutions have been eliminated (Y), the methodology ends at block 164, and returns no solution. If interim solutions remain to be evaluated (N), the methodology advances to decision block 166, where it is determined if all available TOAs have been evaluated. If TOAs remain to be evaluated (N), the methodology returns to block 154 to select a new TOA and update the remaining interim solutions. If all TOAs have been evaluated (Y), the methodology advances to block 164, where the interim solution having the best associated fitness parameter is selected.

Figure 4:
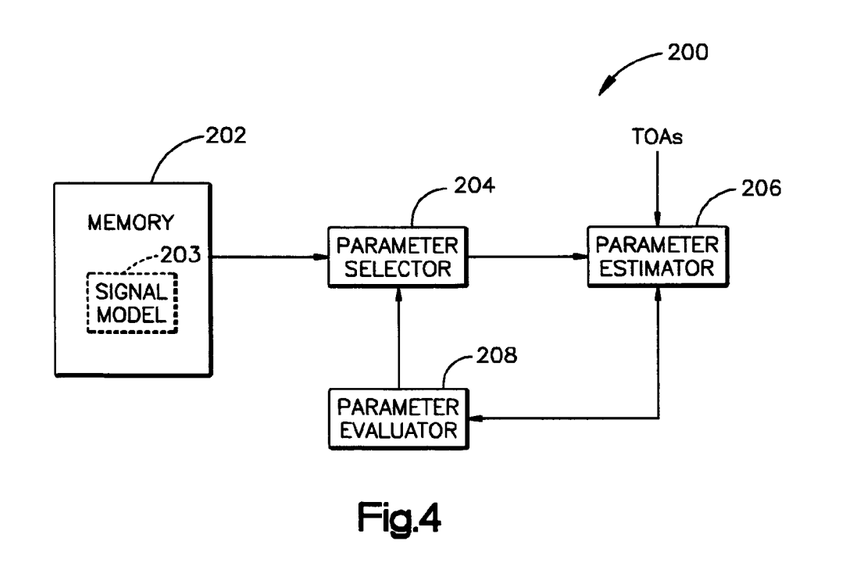
FIG. 4 illustrates a receiver system 200 for locating a pulse emitter according to a plurality of pulse time of arrival (TOA) measurements in accordance with an aspect of the present invention.

FIG. 4 illustrates a receiver system 200 for locating a pulse emitter according to a plurality of pulse time of arrival (TOA) measurements in accordance with an aspect of the present invention. It will be appreciated that the illustrated system can be implemented as one or more computer programs, executable on one or more general purpose data processors. Accordingly, any structures herein described can be implemented alternately as dedicated hardware circuitry for the described function or as a program code stored as part of a computer-assessable memory, such as a computer hard drive, random access memory, or a removable disk medium (e.g., magnetic storage media, flash media, CD and DVD media, etc.). Functions carried out by the illustrated system, but not helpful in understanding the claimed invention, are omitted from this diagram.

In the illustrated implementation, the computer program product is implemented as part of a mobile receiver system, such as an air, space, water or ground vehicle. The mobile receiver can be mobile in three dimensions, such that the elevation of the receiver and the emitter can vary. Accordingly, it can be necessary to estimate the position of the emitter along an elevation component as well as along a two-dimensional surface.

The system 200 includes a memory 202 that stores a signal model 203 that comprises a plurality of parameters. For example, the parameters comprising a given model can include a base clock period, T, a base clock offset, $T_d$, an acceleration sensitivity coefficient, Γ, that indicates the sensitivity of a receiver base clock to acceleration, a clock drift factor, λ, defining a difference in phase between the receiver base clock and the emitter base clock, and a set of Cartesian coordinates, x, y, and z, defining the emitter location.

A subset of the parameters can be selected at a parameter selector 204. The parameters can be selected as to gradually introduce the parameters into a parameter estimation process. Accordingly, sufficient TOAs can be introduced into the estimation process to maintain a smooth fitness surface without the estimation errors that generally result from the simultaneous evaluation of a large number of parameters.

The selected parameters are estimated at a parameter estimator 206. For example, an optimal solution for the selected parameters can be determined according to a grid search of a fitness surface defined by the selected parameters. A fitness parameter associated with the solution can be generated as a result of the estimation process.

The estimated parameters are then provided to a parameter evaluator 208. The parameter evaluator 208 determines if new parameters should be introduced into the estimation process. This can be accomplished, for example, by comparing an error value associated with the estimation process to a threshold value. For example, a solution may benefit from the introduction of a new parameter when the root mean square error associated with the solution increases above the standard measurement error reflected by the Gaussian distribution w(n). Alternatively, the residual error value associated with the solution can be compared to a theoretical error bound (e.g., Cramer-Rao Lower Bound) to determine if a new parameter is desirable.

If the addition of new parameters is determined to be undesirable, the determined solution can be refined at the parameter estimator 206 according to one or more new TOA measurements. The previously determined parameter estimates can be used to focus the search grid associated with the fitness surface. Accordingly, the precision of the parameter estimate can be steadily increased through several iterations.

If it is determined that the addition of new parameters is desirable, the estimation data is provided to the parameter selector 204. The parameter selector 204 selects a new subset of parameters from the signal model 203 and provides them to the parameter estimator 206 for analysis. It will be appreciated that the information gained in previous iterations can be used to limit the search grid associated with both parameters present for previous iterations as well as new parameters related to the previous parameters. Accordingly, the efficiency of the grid search associated with a new parameter can be enhanced.

Figure 5:
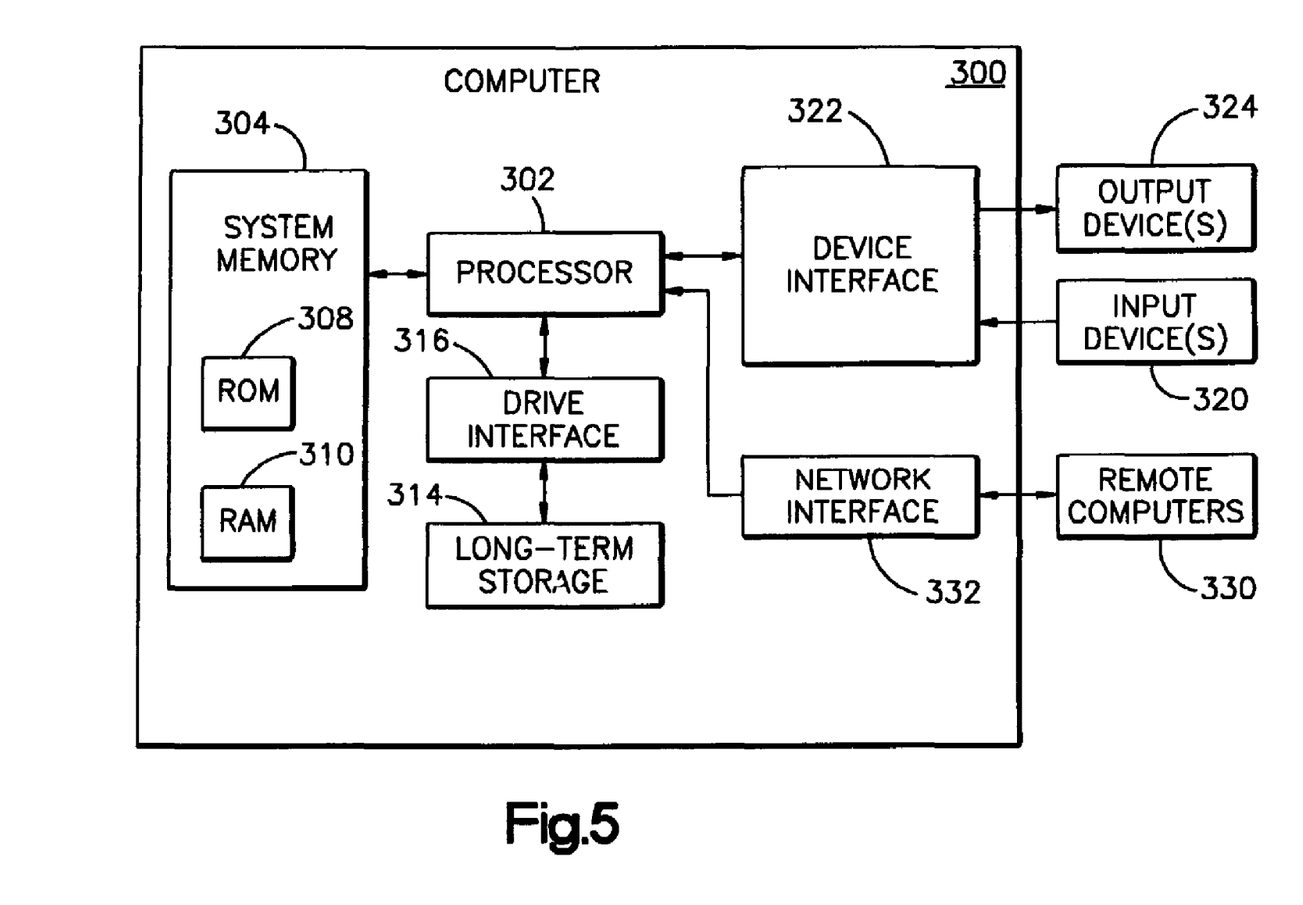
FIG. 5 illustrates a schematic block diagram of an exemplary operating environment for a system configured in accordance with an aspect of the present invention.

FIG. 5 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. Dual microprocessors and other multi-processor architectures can also be utilized as the processor 302. The processor 302 and system memory 304 can be coupled by any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) can reside in the ROM 308, generally containing the basic routines that help to transfer information between elements within the computer system 300, such as a reset or power-up.

The computer system 300 can include one or more types of long-term data storage 314, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the processor 302 by a drive interface 316. The long-term storage components 314 provide nonvolatile storage of data, data structures, and computer-executable instructions for the computer system 300. A number of program modules may also be stored in one or more of the drives as well as in the RAM 310, including an operating system, one or more application programs, other program modules, and program data.

A user may enter commands and information into the computer system 300 through one or more input devices 320, such as a keyboard or a pointing device (e.g., a mouse). These and other input devices are often connected to the processor 302 through a device interface 322. For example, the input devices can be connected to the system bus 306 by one or more a parallel port, a serial port or a universal serial bus (USB). One or more output device(s) 324, such as a visual display device or printer, can also be connected to the processor 302 via the device interface 322.

The computer system 300 may operate in a networked environment using logical connections (e.g., a local area network (LAN) or wide area network (WAN) to one or more remote computers 330. The remote computer 330 may be a workstation, a computer system, a router, a peer device or other common network node, and typically includes many or all of the elements described relative to the computer system 300. The computer system 300 can communicate with the remote computers 330 via a network interface 332, such as a wired or wireless network interface card or modem. In a networked environment, application programs and program data depicted relative to the computer system 300, or portions thereof, may be stored in memory associated with the remote computers 330.

Having described the invention, the following is claimed:

1. A method for determining the location of an emitter, comprising:
   selecting a first subset of a plurality of parameters comprising a signal model associated with the emitter;
   estimating values for the selected first subset of the plurality of parameters from a plurality of time of arrival measurements associated with the emitter and the signal model, the estimation of the selected first subset of the plurality of parameters comprising:
   defining a fitness surface from the selected first subset of the plurality of parameters and the signal model;
   locating local extrema on the fitness surface;
   refining the location of the local extrema to determine at least one candidate solution for the estimated values for the first subset of the plurality of parameters; and
   selecting the candidate solution having the best fitness; and
   generating estimated values for the plurality of parameters according to the estimated values for the selected first subset of the plurality of parameters, a plurality of time of arrival measurements, and the signal model.

2. The method of claim 1, the method further comprising:
   defining a Fisher Information Matrix associated with the step of generating estimated values for the plurality of parameters;
   defining a scaling matrix in which the diagonal elements have values equal to the reciprocal of the square root of the corresponding values in the Fisher Information Matrix;
   producing a scaled representation of the Fisher Information Matrix using the scaling matrix; and
   inverting the scaled representation of the Fisher Information Matrix to produce a Cramer-Rao Lower Bound for the step of estimating the plurality of parameters.

3. The method of claim 1, wherein the step of locating local extrema on the fitness surface includes performing a grid search of the fitness surface, the grid search having a predetermined range for each of the plurality of parameters.

4. The method of claim 3, wherein the step of generating estimated values for the plurality of parameters includes performing a grid search of a fitness surface defined by the plurality of parameters, the grid search encompassing a range of values for the plurality of parameters determined at least in part from the estimated values for the selected first subset of the plurality of parameters.

5. The method of claim 1, wherein the step of locating local extrema on the fitness surface includes the step of calculating a fitness parameter for each of a plurality of grid points in the fitness surface defined by the first subset of the plurality of parameters.

6. The method of claim 5, wherein the step of calculating a fitness parameter includes calculating the root mean square error between the plurality of time of arrival measurements and a set of time of arrival measurements calculated using a set of parameters associated with a given grid point on the fitness surface.

7. The method of claim 5, wherein the step of calculating a fitness parameter includes the step of determining the greatest common denominator of the plurality of time of arrival measurements, wherein the plurality of time of arrival measurements are adjusted according to a set of parameters associated with a given grid point.

8. The method of claim 1, the step of refining the local extrema includes the step of iteratively calculating a plurality of parameter updates for the estimated parameters in accordance with Newton's method.

9. The method of claim 8, wherein the step of iteratively calculating a plurality of parameter updates includes calculating the inverse of an update matrix, derived from the Jacobian of the signal model, via the following steps:
  defining a scaling matrix in which the diagonal elements have values equal to the square root of the corresponding values in the update matrix;
  producing a scaled representation of the update matrix using the scaling matrix;
  inverting the scaled representation of the update matrix; and
  multiplying the scaling matrix by the scaled representation to obtain a first product and multiplying the first product by the scaling matrix to obtain the inverse of the update matrix.

10. The method of claim 1, wherein the step of estimating values for the selected first subset of the plurality of parameters comprises the following steps:
  selecting a second subset of the plurality of parameters, the second subset being smaller than the first subset;
  estimating values for the selected second subset of the plurality of parameters from a plurality of time of arrival measurements associated with the emitter and the signal model; and
  generating estimated values for the first subset of the plurality of parameters according to the estimated values for the selected second subset of the plurality of parameters.

11. The method of claim 10, wherein the selected second subset of the plurality of parameters comprises a bearing parameter that indicates the direction of the emitter.

12. The method of claim 11, wherein the selected first subset of the plurality of parameters comprises at least one Cartesian coordinate associated with the location of the emitter.

13. A computer program product, operative in a data processing system and implemented on a computer readable medium, for determining the location of an emitter having well-behaved timing features from a plurality of time of arrival measurements associated with the emitter comprising:

a parameter selector that selects a first subset of a plurality of parameters comprising a signal model associated with the emitter;
  a parameter estimator that estimates values for the selected first subset of the plurality of parameters from the plurality of time of arrival measurements and the signal model; and
  a parameter evaluator that evaluates the estimated parameter values and directs the parameter selector to select a second, larger subset of the plurality of parameters if an error value associated with the estimation of the first subset meets a threshold value and directs the parameter evaluator to estimate the parameters using at least one additional time of arrival measurement if the error value does not meet a threshold value.

14. The computer program product of claim 13, wherein the computer program product is implemented as part of a mobile receiver.

15. The computer program product of claim 14, wherein the plurality, of parameters comprising the signal model includes an acceleration sensitivity coefficient that models the effect of acceleration on a time reference associated with the mobile receiver as a linear coefficient to the velocity of the mobile receiver.

16. A method for determining the location of an emitter, comprising:
  estimating a plurality of parameters for a signal model associated with the emitter from a plurality of time of arrival measurements associated with the emitter and the signal model;
  defining a Fisher Information Matrix associated with the step of estimating the plurality of parameters;
  defining a scaling matrix in which the diagonal elements have values equal to the square root of the corresponding values in the Fisher Information Matrix;
  producing a scaled representation of the Fisher Information Matrix using the scaling matrix; and
  inverting the scaled representation of the Fisher Information Matrix.

17. The method of claim 16, wherein the step of estimating the plurality of parameters comprises the steps of:
  selecting a first subset of the plurality of parameters;
  estimating values for the selected first subset of the plurality of parameters from the plurality of time of arrival measurements; and
  estimating values for a second, larger subset of the plurality of parameters according to the estimated values for the selected first subset of the plurality of parameters.

18. The method of claim 16, wherein the step of producing a scaled representation of the Fisher Information Matrix comprises the steps of determining the product of the scaling matrix and the Fisher Information matrix to produce a first product and determining the product of the first product and the scaling matrix, such that the diagonal elements of the scaled representation have a value of unity.

19. The method of claim 16, further comprising the step of multiplying the scaling matrix by the scaled representation to obtain a second product and multiplying the second product by the scaling matrix to obtain the Cramer-Rao lower bound.

* * * * *